United States Patent

[11] 3,617,218

| [72] | Inventors | Eugene E. Van Tamelen<br>Los Altos Hills;<br>Robert B. Fechter, Mountain View, both of Calif. |
|---|---|---|
| [21] | Appl. No. | 775,547 |
| [22] | Filed | Nov. 13, 1968 |
| [45] | Patented | Nov. 2, 1971 |
| [73] | Assignee | The United States of America as represented by the Secretary of the Department of Health Education and Welfare |

[54] CATALYTIC SYNTHESIS OF METALLIC HYDRIDES
3 Claims, No Drawings

| [52] | U.S. Cl. | 23/204 |
|---|---|---|
| [51] | Int. Cl. | C01b 6/04 |
| [50] | Field of Search | 23/204; 252/182 |

[56] References Cited
UNITED STATES PATENTS

| 1,958,012 | 5/1934 | Muckenfuss | 23/204 |
|---|---|---|---|
| 2,372,671 | 2/1944 | Hansley | 23/204 |
| 2,946,662 | 7/1960 | Mosely | 23/204 |
| 3,222,288 | 12/1965 | Hansley | 23/204 X |
| 3,387,949 | 6/1968 | Snyder | 23/204 X |

*Primary Examiner*—Oscar R. Vertiz
*Assistant Examiner*—G. O. Peters
*Attorney*—Gregg & Hendricson ABSTRACT: This invention relates to the catalytic, low temperature (e.g., room temperature) production of sodium hydride and other metallic hydrides from the metal and molecular hydrogen using as catalysts an electron acceptor such as naphthalene and a suitable compound of a transition metal such as titanium tetraisopropoxide.

CATALYTIC SYNTHESIS OF METALLIC HYDRIDES

This invention relates to the catalytic production of metallic hydrides at low temperatures.

Heretofore metallic hydrides have been prepared with difficulty, e.g., by high temperature reaction of the metal and hydrogen. For example sodium hydride is prepared commercially by suspending finely divided sodium hydride in a stream of hydrogen at 300° 400° C. and molten sodium is introduced into the stream. See, for example U.S. Pat. No. 2,474,021.

Such methods are disadvantageous because of the need to produce and maintain a high temperature, because of problems of corrosion at high temperatures, because of explosion or fire hazards, etc.

It is an object of the present invention to provide improved methods of preparing metal hydrides.

It is a particular object to provide a method of producing metal hydrides by a catalytic, low temperature reaction.

It is further object to provide a catalyst system which is effective in catalyzing the reaction of metals and hydrogen such as sodium and hydrogen.

These and other objects will be apparent from the ensuing description and appended claims.

In accordance with the present invention, the selected metal is subjected to the action of a catalytic agent which is capable of accepting one or more electrons from the metal in question; the resulting system is brought into intimate contact with hydrogen; and a suitable compound of a transition metal, preferably in one of its higher valence states, is also brought into contact with the system. The reaction may be carried out at room temperature. Preferably the reaction is carried out in a suitable solvent.

The following specific examples will illustrate the invention.

EXAMPLE 1

Naphthalene (1.66 g., 0.0130 m.) was dissolved in dry tetrahydrofuran (THF) to a concentration of 0.16 M. Sodium metal (1.50 g., 0.0652 m.) in pieces of about 0.2 g. in mass were added and the mixture was stirred vigorously at room temperature in an atmosphere of dry hydrogen at atmospheric pressure. (The hydrogen was dried by passing it through a $P_2O_5$ tower and then through a solution of sodium diphenylketyl in tetraglyme). A 0.16 M solution of titanium tetraisopropoxide (TTIP) in THF was added dropwise. Hydrogen was absorbed, and the solution of TTIP was added at a rate to maintain rapid absorption of hydrogen. The amount of TTIP so added did not exceed 1 mole percent of the sodium. Absorption of hydrogen was complete in three hours.

As the reaction neared completion the system changed from an initial dark green color to brown and finally to a red-brown to brown color. The reaction mixture was centrifuged and a gray substance contaminated with small quantities of a white solid was separated. This gray substance was shown by hydrolysis to be sodium hydride, yielding $H_2$ and NaOH in relative molar amounts of 0.98 and 0.95.

EXAMPLE 2

The materials and procedure were essentially the same as in example 1, the major difference being that a 1:1 molar ratio of sodium to naphthalene was used and these two were given time enough to react completely with formation of a solution of sodium naphthalide before exposure to hydrogen and TTIP. Thus, naphthalene (6.4 g., 0.050 m.) was dissolved in THF to a concentration of 0.63 M in an atmosphere of dry argon. Sodium metal (1.15 g., 0.0500 m.) was added and the mixture stirred at room temperature for five hours. The argon atmosphere was replaced by hydrogen. The vigorously stirred dark green solution of sodium naphthalide absorbed hydrogen very slowly. However, when dropwise addition of a 0.05 M solution of TTIP in THF was begun, the rate of hydrogen absorption increased rapidly. The amount of TTIP so added did not exceed 0.1 mole percent of the sodium. Absorption of hydrogen was complete in 47 minutes.

EXAMPLE 3

In another instance, no naphthalene was used, i.e., a sodium dispersion in THF was stirred in an atmosphere of hydrogen and TTIP was added. No hydrogen absorption occurred within a period of ½ hour. When naphthalene and a further quantity of TTIP were added hydrogen was absorbed rapidly.

In the process described, very little TTIP is expended. Naphthalene may be recovered quantitatively. The titanium may also be recovered.

It is believed that the mechanism is as follows: Sodium reacts with naphthalene to produce sodium naphthalide, in known manner, thus (1)

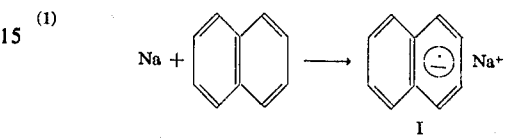

I

The naphthalide I remains dissolved in the solvent. The sodium naphthalide I reacts with titanium tetraisopropoxide to produce a species which is as yet unknown but which contains titanium in a lower valence state, thus (2) $\quad$ 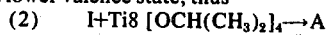

A being the aforesaid species. This species reacts with molecular hydrogen, thus (3) $\quad A + H_2 \rightarrow AH_2$ This hydrogenated species reacts with a further quantity of sodium naphthalide to produce sodium hydride and regenerate A and naphthalene, thus (4)

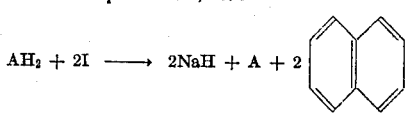

It will be understood that this mechanism is set forth as being probable but that the mechanism may be different. If other metals are used than sodium they take the place of sodium in the various reactions.

Certain substitutions may be made and certain variants may be adopted, as follows:

In place of sodium, other alkali metals and also alkaline earth metals may be used, e.g., lithium, potassium, rubidium, caesium, magnesium, calcium, barium and strontium; also aluminum; also combinations of two or more such metals. Any other metal may be used which is capable of forming a hydride of the type $MH_n$ where $n$ is the valence of the metal and which is also capable of giving up an electron to an acceptor such as naphthalene to form a compound similar to sodium naphthalide wherein the electron provided by the metal is shared as a nonlocalized electron with a group of atoms.

In place of naphthalene, other aromatic and olefinic compounds may be used, and mixtures of such compounds may be employed. The requirement is that the selected species be capable of forming a naphthalide type of anion with one or more electrons donated by the selected metal, such donated electron or electrons being nonlocalized electrons. Examples of substitutes for naphthalene are other condensed ring aromatic hydrocarbons such as anthracene and phenanthrene; homologues of such condensed ring compounds; substitution products of such condensed ring hydrocarbons in which there are substituents which contain one or more hetero atoms provided the hetero atoms do not interfere with the ability of the compound to accept unshared electrons; also other diverse type of compounds having similar capability of accepting electrons such as benzophenone, tetraphenylethylene, cyclo-octatetraene tetraphenylene, pyridine, bipyridyl, etc.

Substitutes for titanium include other transition metals such as vanadium, cobalt, ruthenium, osmium, iron, molybdenum, nickel, iridium and chromium. The transition metal will ordinarily be used as a starting material in one of its higher valence states and ordinarily its highest valence state will be preferred. For example, Ti(IV) is preferred but Ti(III) may be used. The entity associated with the titanium or other transition metal may be the isopropoxide radical as in the examples above. However, the ligand may be any alkoxy (e.g., ethoxy, n-propoxy, n- iso- or tert. - butoxy, etc.) or aryloxy (e.g., phenoxy) radical. Also ligands of different types may be employed, e.g., acyloxy (e.g., acetoxy), thio analogues of alkoxy ($CH_3S-$, $C_6H_6S-$, etc.), unsaturated organic entities such as ethylene, butadiene, acetylene and their derivatives. Also metallocenes such as titanocene, ferrocene, etc. may be used as the transition metal entity. Transition metal halides e.g., $TiCl_4$ may be used but are not preferred.

A wide variety of solvents is permissible. Generally speaking, ether type solvents such as dimethyl, diethyl, and other dialkyl ethers, dimethoxy ethane, diglyme and tetrahydrofuran are employed. Also fluorinated solvents such as the fluorinated lower hydrocarbons; also tertiary amines such as trimethyl and triethyl amines may be used. The only requirements for the solvent are that it be sufficiently inert toward the system and that it dissolve the catalysts.

In general it is preferred to provide a body of the selected metal and organic catalyst (e.g., naphthalene) the latter being dissolved in a solvent if one is necessary, or is preferred; to provide adequate agitation and contact with molecular hydrogen (which is preferably dry and free of oxygen and other reactive impurities); and to add the transition metal catalyst continuously or by increments to the reaction mixture. If all of the catalyst is added at the outset, yields will be diminished. in some cases greatly so. The process may be carried out continuously or batchwise.

It will therefore be apparent that a novel and very useful process of producing metal hydrides has been provided.

We claim:

1. A method of preparing alkali metal hydrides which comprises contacting an alkali metal with molecular hydrogen at atmospheric pressure and room temperature in the presence of a reactive aromatic or olefinic compound capable of forming a naphthalide type of anion with one or more electrons donated by the selected metal, such donated electron or electrons being nonlocalized electrons and a titanium IV catalyst.

2. The method of claim 1 wherein the alkali metal is sodium.

3. The method of claim 2 wherein said reactive compound is naphthalene.

* * * * *